(12) United States Patent
Bodas et al.

(10) Patent No.: US 9,971,391 B2
(45) Date of Patent: May 15, 2018

(54) METHOD TO ASSESS ENERGY EFFICIENCY OF HPC SYSTEM OPERATED WITH AND WITHOUT POWER CONSTRAINTS

(71) Applicant: Intel Corporation, Santa Clara, CA (US)

(72) Inventors: Devadatta Bodas, Federal Way, WA (US); Meenakshi Arunachalam, Portland, OR (US); Ilya Sharapov, San Jose, CA (US); Charles R. Yount, Phoenix, AZ (US); Scott B. Huck, Portland, OR (US); Ramakrishna Huggahalli, Costa Mesa, CA (US); Justin J. Song, Olympia, WA (US); Brian J. Griffith, Auburn, WA (US); Muralidhar Rajappa, Chandler, AZ (US); Lingdan (Linda) Zeng, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 151 days.

(21) Appl. No.: 14/757,903

(22) Filed: Dec. 23, 2015

(65) Prior Publication Data
US 2017/0185132 A1    Jun. 29, 2017

(51) Int. Cl.
*G06F 1/32* (2006.01)
*G06F 1/26* (2006.01)
*G06F 11/34* (2006.01)

(52) U.S. Cl.
CPC ............ *G06F 1/3206* (2013.01); *G06F 1/324* (2013.01); *G06F 11/3428* (2013.01); *Y02B 60/1217* (2013.01)

(58) Field of Classification Search
CPC .................................. G06F 1/26; G06F 1/32
See application file for complete search history.

(56) References Cited

U.S. PATENT DOCUMENTS 9,329,670 B2 * 5/2016 Allen-Ware ............ G06F 1/329
2008/0127083 A1 5/2008 Brown et al.
(Continued)

FOREIGN PATENT DOCUMENTS

EP          2568384 A1    3/2013
WO     WO 2017/112058    6/2017

OTHER PUBLICATIONS

Korean IP Office, Notification of Transmittal of the International Search Report and the Written Opinion of the International Searching Authority for counterpart International Application No. PCT/US2016/057543, 10 pgs., (dated Jan. 31, 2017).

*Primary Examiner* — Phil Nguyen
(74) *Attorney, Agent, or Firm* — Patent Capital Group

(57) ABSTRACT

A method of assessing energy efficiency of a High-performance computing (HPC) system, including: selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint is shown.

22 Claims, 10 Drawing Sheets

(56) References Cited

U.S. PATENT DOCUMENTS

| | | |
|---|---|---|
| 2011/0239006 A1 | 9/2011 | Hsu et al. |
| 2011/0271283 A1* | 11/2011 | Bell, Jr. ................ G06F 9/5094 718/102 |
| 2012/0204042 A1* | 8/2012 | Sistla ................... G06F 1/3206 713/310 |
| 2012/0216205 A1 | 8/2012 | Bell, Jr. et al. |
| 2014/0047272 A1 | 2/2014 | Breternitz et al. |
| 2015/0185816 A1* | 7/2015 | Petrica ................. G06F 1/3287 713/324 |
| 2015/0347666 A1* | 12/2015 | Zhang ................ G06F 17/5081 716/109 |
| 2016/0062867 A1* | 3/2016 | Rodriguez .......... G06F 11/3428 702/186 |

* cited by examiner

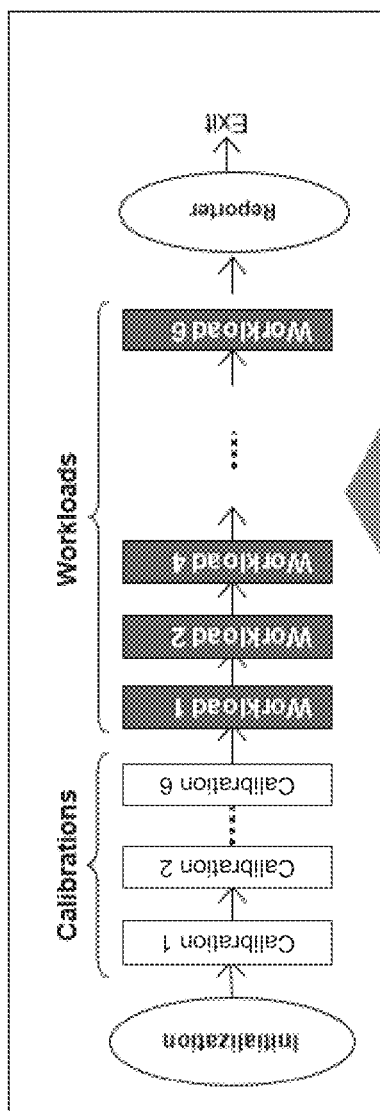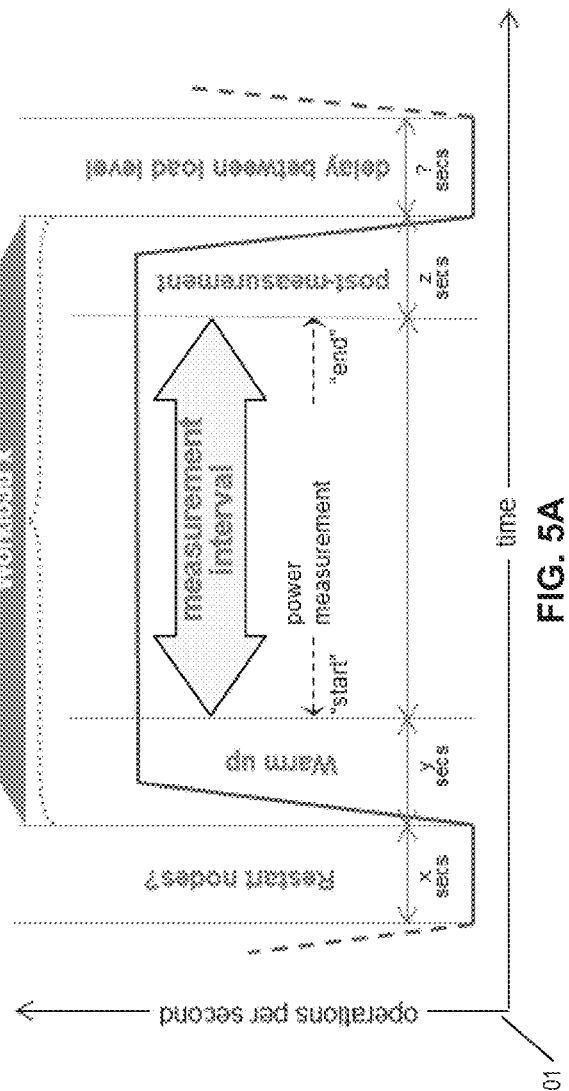
FIG. 5B
FIG. 5A

600

HPL (i=1)

| System Under Test | Cluster power W(1,j) | Performance P(1,j) | Perf/watt P(1,j)/W(1,j) | Normalized Perf/watt S(1,j) |
|---|---|---|---|---|
| 100% no power limit (j=1) | 3250 | 7930 | 2.44 | 1.08 |
| 90% (j=2) | 2925 | 7200 | 2.46 | 1.09 |
| 80% (j=3) | 2600 | 6740 | 2.59 | 1.15 |
| 70% (j=4) | 2275 | 5390 | 2.37 | 1.05 |
| 60% (j=5) | 1950 | 4360 | 2.24 | 0.99 |
| 50% (j=6) | 1625 | 2800 | 1.72 | 0.76 |
| Workload efficiency | | | E(i) --> | 1.02 |

UMT (i=4)

| | Cluster power W(4,j) | Performance P(4,j) | Perf/watt P(4,j)/W(4,j) | Normalized Perf/watt S(4,j) |
|---|---|---|---|---|
| 100% (j=1) | 3000 | 21.4 | 0.01 | 0.93 |
| 90% (j=2) | 2700 | 19 | 0.01 | 0.92 |
| 80% (j=3) | 2400 | 16.5 | 0.01 | 0.90 |
| 70% (j=4) | 2100 | 15 | 0.01 | 0.93 |
| 60% (j=5) | 1800 | 12.6 | 0.01 | 0.92 |
| 50% (j=6) | 1500 | 10 | 0.01 | 0.87 |
| | | | E(i) --> | 0.91 |

HPCG (i=2)

| | Cluster power W(2,j) | Performance P(2,j) | Perf/watt P(2,j)/W(2,j) | Normalized Perf/watt S(2,j) |
|---|---|---|---|---|
| 100% (j=1) | 3000 | 1300 | 0.43 | 1.01 |
| 90% (j=2) | 2700 | 1130 | 0.42 | 0.97 |
| 80% (j=3) | 2400 | 1005 | 0.42 | 0.98 |
| 70% (j=4) | 2100 | 850 | 0.40 | 0.94 |
| 60% (j=5) | 1800 | 720 | 0.40 | 0.93 |
| 50% (j=6) | 1500 | 600 | 0.40 | 0.93 |
| | | | E(i) --> | 0.96 |

MiniGhost (i=3)

| | Cluster power W(3,j) | Performance P(3,j) | Perf/watt P(3,j)/W(3,j) | Normalized Perf/watt S(3,j) |
|---|---|---|---|---|
| 100% (j=1) | 3300 | 8.54E+03 | 2.59 | 0.98 |
| 90% (j=2) | 2970 | 8.20E+03 | 2.76 | 1.05 |
| 80% (j=3) | 2640 | 7.50E+03 | 2.84 | 1.08 |
| 70% (j=4) | 2310 | 5.70E+03 | 2.47 | 0.93 |
| 60% (j=5) | 1980 | 4.70E+03 | 2.37 | 0.90 |
| 50% (j=6) | 1650 | 3.00E+03 | 1.82 | 0.69 |
| | | | E(i) --> | 0.93 |

Ptrans (i=5)

| | Cluster power W(5,j) | Performance P(5,j) | Perf/watt P(5,j)/W(5,j) | Normalized Perf/watt S(5,j) |
|---|---|---|---|---|
| 100% (j=1) | 2100 | 20 | 0.01 | 1.00 |
| 90% (j=2) | 1890 | 18 | 0.01 | 1.00 |
| 80% (j=3) | 1680 | 16.4 | 0.01 | 1.02 |
| 70% (j=4) | 1470 | 15 | 0.01 | 1.07 |
| 60% (j=5) | 1260 | 13.4 | 0.01 | 1.12 |
| 50% (j=6) | 1050 | 11 | 0.01 | 1.10 |
| | | | E(i) --> | 1.05 | miniMD (i=6)

| | Cluster power W(6,j) | Performance P(6,j) | Perf/watt P(6,j)/W(6,j) | Normalized Perf/watt S(6,j) |
|---|---|---|---|---|
| 100% (j=1) | 2100 | 105 | 0.05 | 1.05 |
| 90% (j=2) | 1890 | 84 | 0.04 | 0.93 |
| 80% (j=3) | 1680 | 72 | 0.04 | 0.90 |
| 70% (j=4) | 1470 | 60 | 0.04 | 0.86 |
| 60% (j=5) | 1260 | 47 | 0.04 | 0.76 |
| 50% (j=6) | 1050 | 30 | 0.03 | 0.60 |
| | | | E(i) --> | 0.84 |

FIG. 6A

METHOD TO ASSESS ENERGY EFFICIENCY OF HPC SYSTEM OPERATED WITH AND WITHOUT POWER CONSTRAINTS

FIELD OF THE INVENTION

Embodiments of the present invention relate to the field of computer systems; and more particularly, embodiments of the present invention relate to assessing energy efficiency of high performance computing systems that are operated with and without power constraints.

BACKGROUND OF THE INVENTION

A High Performance Computing (HPC) system performs parallel computing by simultaneous use of multiple nodes to execute a computational assignment referred to as a job. Each node typically includes processors, memory, operating system, and input-output (I/O) components. The nodes communicate with each other through a high speed network fabric and may use shared file systems or storage. The job is divided in thousands of parallel tasks distributed over thousands of nodes. These tasks synchronize with each other hundreds of times a second. Usually, a HPC system can consume megawatts of power.

Growing usage of HPC systems in the recent years have made power management a concern in the industry, especially in terms of energy efficiency. Future systems are expected to deliver higher performance, while operating under less than the power allocation that they are designed for. In response to this demand, future HPC systems will be measured decidedly on how well the systems perform while operating with a limited power allocation. However, there is no standard method of measurement or benchmarking technique to measure energy efficiency of HPC systems while operating with and without power constraints.

Currently, operating a system without exceeding its allocated power budget requires technologies to monitor power, distribute the power budget to jobs running on the system, and maximize performance while operating jobs on one or more nodes under a power constraint. However, conventional benchmarking techniques are not designed to measure the impact of the application of these technologies.

The most commonly used benchmarking techniques include SPECpower, which measures energy proportionality between power consumed in a server and its utilization, or Green500, which measures energy efficiency of an HPC system while operating LINPACK without any power constraints. Typically, SPECpower is used in the server industry and measures energy proportionality when the servers are not 100% utilized. As such, a good SPECpower benchmark reading can be manipulated by using low-power servers that are operating during long periods of time. On the other hand, Green500 measures energy efficiency of an HPC system when the system is achieving its peak performance without any power constraints.

Typically, users of an HPC system expect the system to run at its optimal energy efficiency level, while operating under a dedicated power constraint on the performance of the system. Furthermore, growth in performance of HPC systems is expected to be exponential, and similarly the demand for energy and power is expected to grow significantly. As such, future systems may lack the required power allocation to run the systems efficiently, especially since the power allocation will be dynamic and many times lower than the peak demand. Therefore, conventional measurements of energy efficiency can be totally misleading, and fail to account for varying levels of power constraints.

BRIEF DESCRIPTION OF THE DRAWINGS

The invention may best be understood by referring to the following description and accompanying drawings that are used to illustrate embodiments of the invention. In the drawings:

FIGS. 5A-B illustrate an example of measuring energy efficiency of an HPC system with one or more workloads according to one embodiment.

FIGS. 6A-B illustrate different examples of assessing and benchmarking energy efficiency with one or more measured workloads according to one embodiment.

DETAILED DESCRIPTION OF THE PRESENT INVENTION

Figure 1:
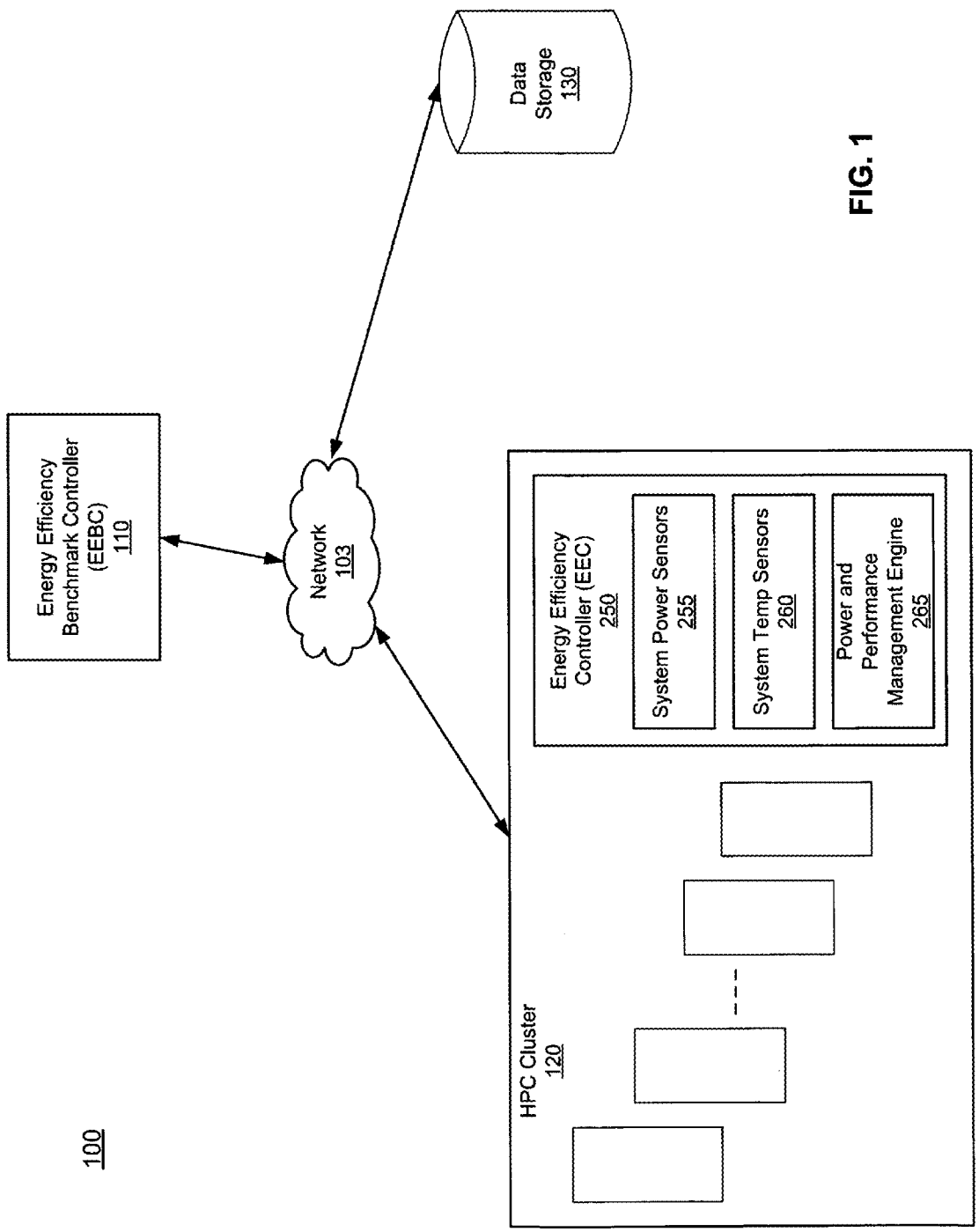
FIG. 1 is an exemplary block diagram illustrating an overall architecture of a HPC energy efficiency controller system according to one embodiment.

The following description describes methods and apparatuses for assessing energy efficiency of an HPC system with and without power constraints. Specifically, methods and apparatuses that provide a benchmarking technique to measure energy efficiency of HPC systems under various power constraints are described herein. An energy efficiency benchmark provides a metric to accurately assess the impacts of jobs, workloads, and other associated HPC technologies on the energy efficiency of a HPC system. These techniques described herein also advantageously eliminate the existing power monitoring inaccuracy, efficiently budget allocated power, and account for HPC systems operating under various power constraints.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments can be implemented in numerous ways, including as a process, an apparatus, a system, a composition of matter, a computer readable medium such as a computer readable storage medium or a computer network wherein program instructions are sent over optical or communication links. A component such as a processor or a memory described as being configured to perform a task includes a general component that is temporarily configured to perform the task at a given time and/or a specific component that is manufactured to perform the task. In general, the order of the steps of disclosed processes can be altered within the scope of the invention.

FIG. 1 is an exemplary block diagram illustrating an overall architecture of a HPC energy efficiency controller system according to one embodiment. As used herein, an "energy efficiency (EE) benchmarking technique" (also referred to as an EE benchmark metric and an overall EE benchmark metric) refers to a standard of measurement for assessing energy efficiency of an HPC system under various power constraints by running multiple workloads and collecting results at various power limits to generate the corresponding EE benchmark metric. Referring now to FIG. 1, system 100 includes, but is not limited to, energy efficiency benchmark controller 110 communicatively coupled to HPC cluster 120 (also referred to as a HPC system) and data storage 130 over network 103.

Energy efficiency benchmark controller 110 (hereinafter, "EEBC 110") may include or represent a computer or group of computers equipped with software modules that, when executed are able to facilitate improvement in energy efficiency and the use of resources contained within HPC cluster 120, which includes or represents a cluster of HPC nodes. Each node comprises one or more processors, one or more controllers, or both coupled to a memory. HPC cluster 120 is measured by our energy efficiency benchmarking (EEB) technique, which assesses how well the technologies of HPC cluster 120 are doing in terms of energy efficiency. As such, EEBC 110 manages and operates the EEB technique using a controller program. However, note that EEBC does not influence power or energy of any system. Instead, EEBC 110 provides operating conditions to launch/run one or more workloads on an HPC system and then assesses how the system performs under those operating conditions, using an energy efficiency controller (EEC) in the system.

Further, EEBC 110 calculates a number of performance and power measurement values associated with each node and uses the calculated number to analyze node operation and enhance energy efficiency. The performance and power values calculated may differ for example based on computing hardware specifications and types of software running on the provided hardware. Completely different performances and power levels may be produced base on, for example, the type of computer and processing chip, the type of operating system, and the type of application program running. Accordingly, EEBC 110 is able to operate across these dimensions in order to accurately gauge performance, power levels, and energy efficiency in the actual usage environment under varying power constraints. EEBC 110 can assess the energy efficiency of a configuration and determine whether the capacity is sufficiently utilized. The details of the method and system will be described below in connection with the remaining figures.

In one embodiment, HPC cluster 120 includes or represents any type of servers or a cluster of one or more servers (e.g., HPC nodes). HPC cluster 120 includes one or more server racks, and each server rack includes one or more HPC nodes. HPC cluster 120 also includes one or more components that are used to convert and deliver power and the cooling system (i.e., EEBC 110 considers the total energy and power used by the HPC cluster). In one embodiment, each HPC cluster is assessed and controlled by an HPC controller manager, such as for example, EEBC 110. HPC cluster 120 is the higher managing component of the one or more HPC nodes that represent the overall HPC system. In addition, each server rack of HPC cluster 120 includes multiple HPC nodes.

For example, HPC cluster 120 may include or represent a large quantity of resources contained within an organization or a division within an organization, such as a line of business. In one embodiment, HPC cluster 120 includes a comprehensive set of software and hardware resources and may include hundreds or thousands of nodes/servers. The nodes of HPC cluster 120 may act in various capacities. In one embodiment, the nodes of HPC cluster 120 may be application servers, database servers, or web servers. The nodes of HPC cluster 120 may further include virtual instances of a server, shared servers, and dedicated servers. As such, EEBC 110 can maintain and assess energy efficiency across the multiple nodes of HPC cluster 120 that are allocated to a single application or a single server running one or more applications (e.g., different HPC workloads: High Performance LINPACK (HPL), miniGhost, miniMD, High Performance Conjugate Gradient (HPCG), Parallel Transpose (Ptrans), Unstructured Mesh Deterministic Radiation Transport (UMT2013), etc.).

In the instance of a virtual server, for example, a set of nodes may be assessed and operated to appear as multiple computers without having to incur the multiple different hardware components. Therefore, the set of nodes may look like different computers and run different applications and operating systems so that it provides a layer of virtualization. Typically, each node within HPC cluster 120 may have a HPC data manger (not shown) or other similar mechanism for gathering server data for delivery to data storage 130.

In one embodiment, data storage 130 represents a global data storage system serving an entire organization. Alternatively, in another embodiment, data storage 130 may include multiple data storage systems to be provided within each of multiple divisions of an organization. Therefore, in some embodiments of the invention, the HPC data manager from each node or group of nodes reports and populates performance and power information into data storage 130. This performance and power information becomes available to EEBC 110 over network 103 in order to assess the energy efficiency of the HPC system (e.g., HPC cluster 120). Network 103 may be any type of networks such as a local area network (LAN), a wide area network (WAN) such as the Internet, a wireless personal area network (PAN), a fiber network, a storage network, or a combination thereof, wired or wireless.

To assess the energy efficiency of the HPC system according to one embodiment, EEBC 110 selects a plurality of HPC workloads to run on a system under test (SUT) with one or more power constraints (e.g., 90-50% of the measured system power), wherein the SUT includes a plurality of HPC nodes in the HPC system. In one embodiment, selecting various HPC workloads to run on the SUT (described in further detail below) provide opportunities to showcase energy efficiency optimizations in various components of the HPC system's architecture. For example, the workloads provide diversity of computations and also stress different parts of the system, such as compute utilization, vectorization, cache and memory hierarchy, inter-node communication, etc.

After selecting the HPC workloads, EEBC 110 executes the plurality of HPC workloads on the SUT. Accordingly, EEBC 110 then generates a benchmark metric for the SUT based on a baseline configuration for each selected HPC workload and a plurality of measured performance per power values for each executed workload at each selected power constraint. In one embodiment, a baseline configuration (discussed in further detail below) is generated for each selected HPC workload (i.e., this reports performance per watt, where power is based upon the measured energy consumed while running the workload). Note that when generating/calculating performance per watt (also referred to as performance per power) of a selected HPC workload under a power constraint, EEBC 110 may base the energy efficiency calculations based on allocated power and not the consumed power, according to one embodiment. However, in some alternative embodiments, EEBC 110 may also build an EE metric using only measured power. Using measured power to calculate the EE metric is also a good assessment indicator, however the issue with using measured power is that it allows the possibility of manipulating the system to get better energy efficiency results.

In one embodiment, a controlling node may be used to execute and run the benchmark control software that was developed to implement the EE benchmarking technique. For example, if the HPC data manager selects six HPC workloads and six power constraints, this results in six pairs measured performance per power values for each workload—one with unlimited power constraint and five with limited power constraints. In one embodiment, for each of the six pairs of results, EEBC 110 divides the measured performance per power values by the baseline configuration to obtain six normalized energy efficiency scores, which contain no units of measurements. At this point, for this example, there are thirty-six scores for the SUT: six scores for each of the six workloads. As such, the benchmark metric for the SUT is based on theses measured scores, which are based on the baseline configuration and measured performance per power values.

An advantage of the embodiments described herein is that the energy efficiency benchmark metric will drive technologies and HPC systems to achieve their optimal performance during constrained and unconstrained power allocations. As such, even though an HPC system may run on a constrained power allocation, each HPC node is expected to be utilized in a way to deliver increased performance and cause significant reduction of energy consumption. In other words, the EE benchmark metric provides a needed measure of goodness for HPC systems and technologies that allows users to accurately monitor their power allocation and address/adjust power limitations within the HPC system in such a way to achieve the highest performance.

Note that some or all of the components as shown and described above (e.g., EEBC 110) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
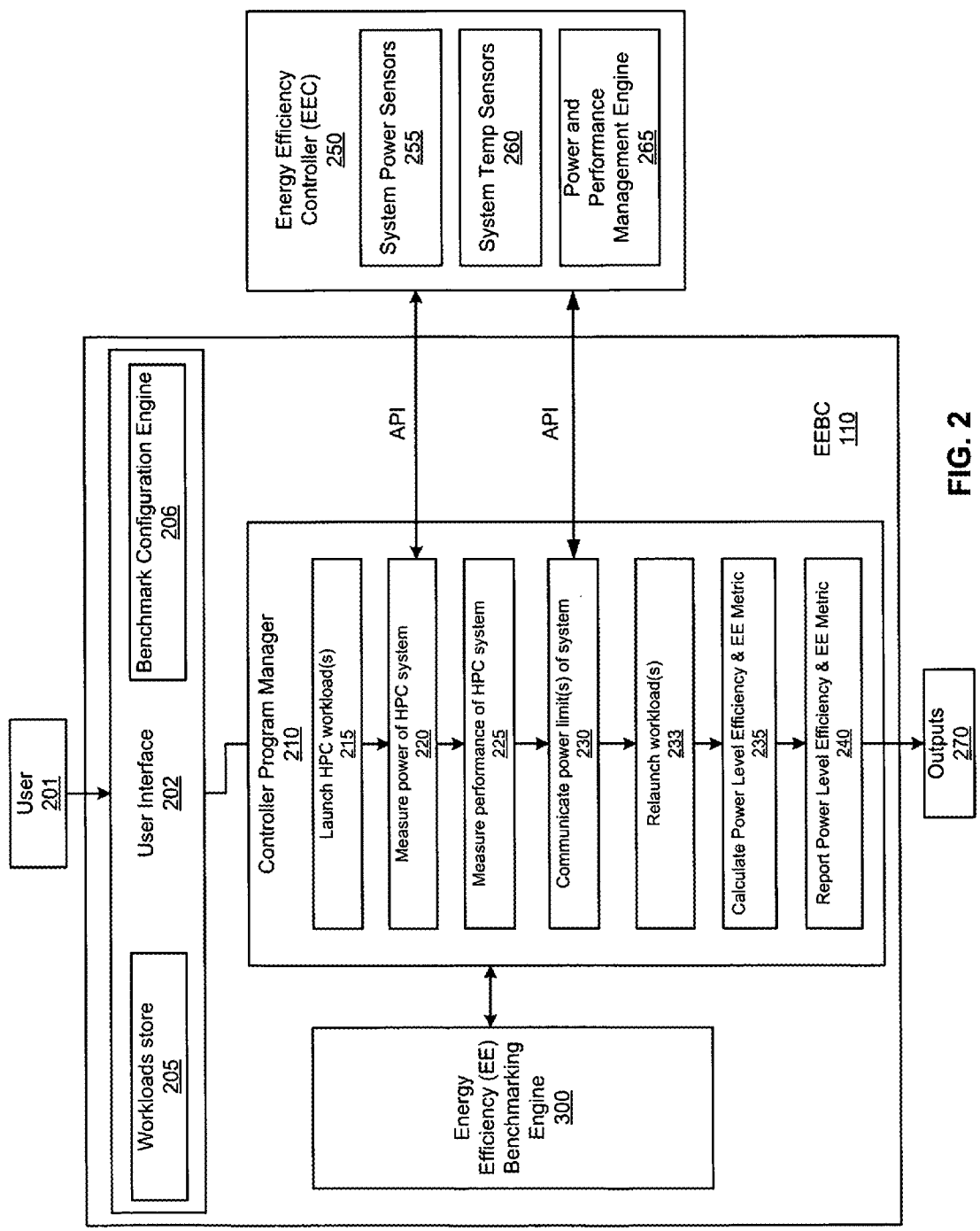
FIG. 2 is an exemplary block diagram illustrating a HPC energy efficiency benchmark controller according to one embodiment.

FIG. 2 is an exemplary block diagram illustrating a HPC energy efficiency benchmark controller according to one embodiment. As such, FIG. 2 illustrates an example of interactions between different components of EEBC 110. It is pointed out that the components of FIG. 2 that have the same reference numbers (or names) as components of any other figure can operate or function in any manner similar to that described herein, but are not limited to such. Further, the lines connecting the blocks represent communication between different components of a HPC energy efficiency benchmark controller.

Referring now to FIG. 2, system 200 includes, but is not limited to, user 201, EEBC 110, EEC 250, and outputs 270. According to one embodiment, EEBC 110 includes, but is not limited to, user interface 202 communicatively coupled to CPM 210 (hereinafter, "CPM 210") and energy efficiency controller 250 (hereinafter, "EEC 250"). User 201 may be or represents a client, an administrator, or a HPC data manager that operates EEBC 110 via user interface 202. In one embodiment, user 201 may be limited to selecting workloads to launch and how the selected workloads should be run (i.e., the "run" commands). Alternatively, benchmark configuration is the set of options that define a definition of the EE benchmark. As such, if user 201 wants to compare one HPC system with another HPC system or one technology with another technology, then user 201 may not modify the benchmark configuration (e.g., benchmark configuration engine 206). The benchmark configuration is not limited to a particular benchmark configuration. Accordingly, the benchmark configuration is configured to assess energy efficiency using one configuration for example, however the parameters of the benchmark configuration may subsequently be reconfigured/updated/changed in order to accommodate user demand, new technology, new workloads, etc.

According to one embodiment, user 201 provides a list of workloads that assess the energy efficiency of the system, selects a set of operating conditions to run the workloads, and selects one or more options on how to calculate energy efficiency. In one embodiment, EEBC 110 includes user interface 202 configured to receive one or more resource requests from user 201—using the Remote Procedure Call (RPC), Hypertext Transfer Protocol Source (HTTPS), Representational State Transfer (REST) protocol, or any combination thereof—to assess the energy efficiency or individual parameters, such as power levels or performance, of the HPC system. User interface 202 can be a wired interface (such as a bus or port), a wireless interface, or a combination of the two. User interface 202 is configured at least to connect to a network (e.g., network 103).

In one embodiment, user interface 202 includes, but is not limited to, workloads store 205 and benchmark configuration engine 206, and user 201 may configure each of them. Workloads store 205 provides a list of workloads (e.g., HPL, HPCG, miniMD, miniGhost, UMT2013, Ptrans, etc.) and "run" commands that are available to execute and assess the HPC system. For example, user 201 may select one workload or select all of the available workloads to run on the HPC system. In one embodiment, each workload has a "run" command that is used to launch the workload itself. Note that the workloads may be run one at a time (that is one after another), or a set of workloads could be run simultaneously if a parameter of the benchmark configuration is defined to run multiple workloads at the same time.

Figure 7:
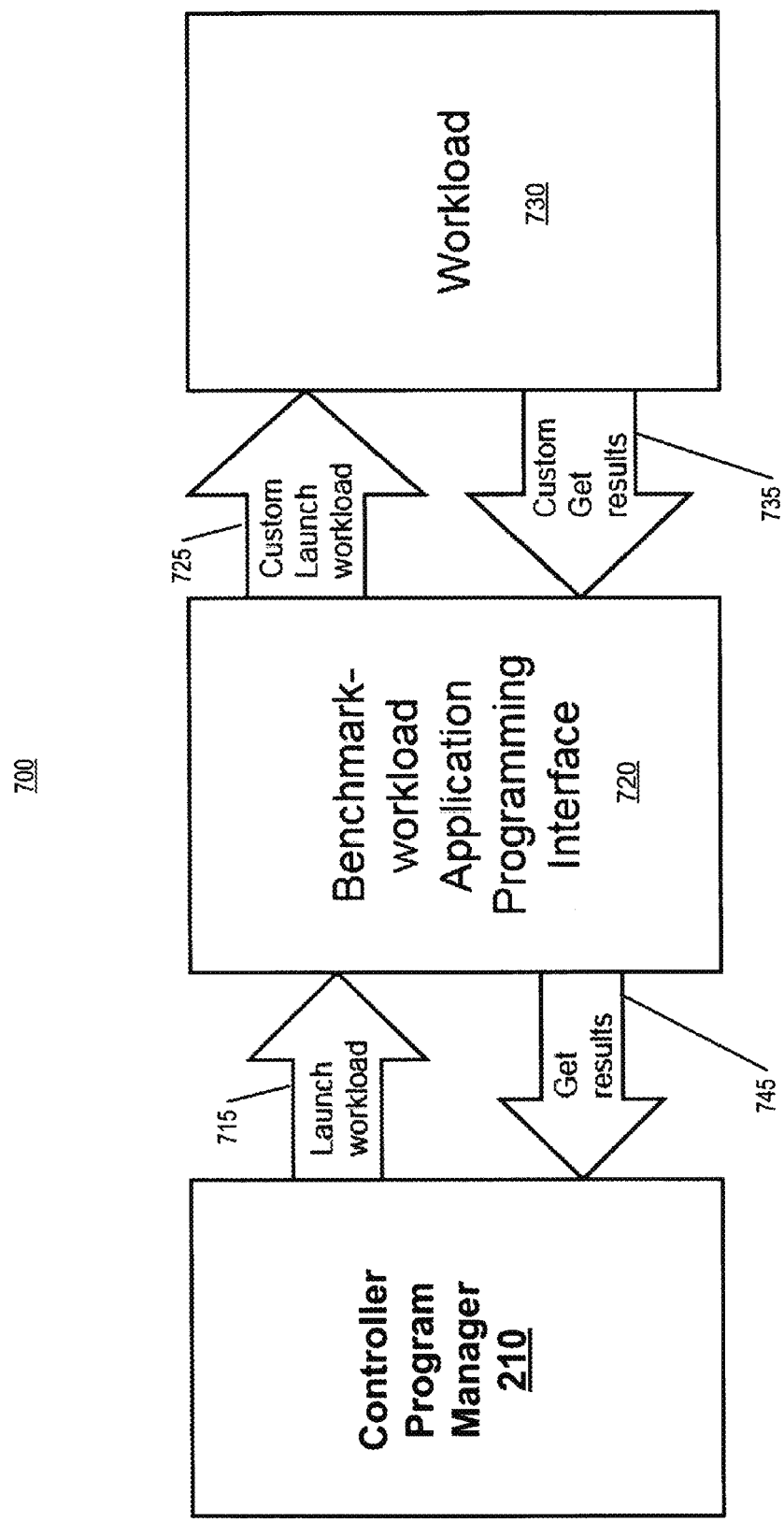
FIG. 7 is an exemplary block diagram illustrating a benchmark-workload application programming system according to one embodiment.

For example, workloads store 205 includes a list of "run" commands based on the predefined benchmark configurations, however a user may provide additional/alternate "run" commands for new workloads that are not included in workloads store 205 (as shown in FIG. 7). In addition, each workload may have a different method to measure performance and cover a variety of user applications (e.g., FLOPs, megabytes, transactions, etc.). As such, each workload tests different parts of the HPC system, and when combined the selected workloads result in a diversity of computations that offer a more accurate assessment of the HPC system.

In one embodiment, benchmark configuration engine 206 may be utilized to establish a baseline power and a baseline performance. Benchmark configuration engine 206 may also be configured to provide one or more power levels, an idle time between runs, a total number of runs, and any other benchmark configuration that is applicable to the HPC system. In one embodiment, benchmark configuration engine 206 implements various benchmarking techniques in order to provide one or more energy efficiency benchmarks (e.g., workload energy efficiency, power level energy efficiency, and overall EE benchmark metric) for each HPC node within the collection of HPC nodes being analyzed. Benchmark configuration engine 206 includes various parameters that perform a number of functions at the start of each workload, for example, providing the power levels and number of runs for the selected workload.

In one embodiment, benchmark configuration engine 206 defines the power levels (e.g., 90%, 80%, and 70% of measured system power) for the workloads selected from workloads store 205. Once user 201 has selected workloads and run commands from workload store 205, the selected workloads and defined benchmark configuration are forwarded to CPM 210. According to one embodiment, CPM 210 is communicatively coupled to energy efficiency benchmarking engine 300 (hereinafter, "EE benchmarking engine 300"), EEC 250, and outputs 270. EE benchmarking engine 300 may include hardware, firmware, software, or any combination. In one embodiment, EE benchmarking engine 300 includes, but is not limited to, a controller node, a system under test (SUT), a power strip, a temperature (temp) sensor, and a power meter. In one embodiment, EE benchmarking engine 300 (described in further detail in FIG. 3) is designed to be operable on a HPC cluster that includes everything needed to operate a HPC cluster in a user environment, which may include communication fabric, storage system, manageability solution, power, and cooling infrastructure. For example, since all these elements are required to fulfill user expectations, EE benchmarking engine 300 also measures the energy consumed by all these elements in order to calculate an overall EE benchmarking metric for the HPC cluster.

EEC 250 includes system power sensors 255, system temp sensors 260, and power and performance management engine 265. In one embodiment, EEC 250 monitors/controls each HPC system and its various hardware and software technologies that manage energy efficiency of the respective system under various operating conditions. For example, EEC 250 is configured to monitor the amount of available power for the HPC system under one or more power constraints (unlimited and/or limited). When EEC 250 is determining the amount of available power, EEC 250 takes into consideration that some HPC technologies are in some cases spread in one or more components, boards, platforms, racks, or systems.

In one embodiment, power and performance management engine 265 monitors and controls the power, performance, and temperature of the HPC system under test. For example, power and performance management engine 265 monitors the power limits of the HPC system, and controls the power limits to stay within their limits during each workload run. Power and performance management engine 265 can monitor and control the power limits of an HPC system with a node manager, a running average power limit (RAPL), setting a common CPU frequency, and/or any other workload/job manager.

In one embodiment, EEC 250 measures the power and performance of the HPC system using system power sensor 255 and system temp sensor 260. System power sensor 255 may include an intelligent platform management interface (IPMI), one or more power meters, a power meter (PM) bus (e.g. PM bus from a power supply), and/or a power report from the HPC cluster to monitor the power of the HPC cluster. System temp sensor 260 may include an IPMI and/or any other temperature-monitoring sensor. Furthermore, EEC 250 reports the measured power and performance values to CPM 210 via an application program interface.

CPM 210 includes a benchmark control software (also referred to as a control software, an EE benchmark control software, and/or an orchestration software) that performs a number of functions (e.g., modules 215-240). According to one embodiment, the benchmark control software may include an operating system, a compiler, and/or one or more API tools and mechanisms (e.g., a message passing interface (MPI), a partitioned global address space (PGAS), etc.). In one embodiment, at the start of each workload, control program manager 210 inputs the selected workloads from workload store 205 and the benchmark parameters (e.g., baseline power, baseline performance, power levels, etc.) from benchmark configuration engine 206. In one embodiment, the benchmark control software of CPM 210 communicates with a power meter (e.g., power meter 320) and a manageability agent to measure energy and profile power from the HPC cluster. When necessary, the benchmark control software sets one or more power limits for the HPC cluster before launching a workload. Furthermore, the benchmark control software issues a "run" command to launch a workload with or without any power limits.

In one embodiment, modules 215-240 may be implemented to perform an EE benchmarking technique that assesses energy efficiency of an HPC cluster while operating with one or more power constraints. Although the aforementioned components are shown as discrete modules and in one communicatively coupled order, each of the modules may alternatively be integrated with one another and performed in a different order. If the modules are discrete, multiple modules may operate cooperatively as will be further discussed below.

The EE benchmarking technique is performed by processing logic that may comprise hardware (circuitry, dedicated logic, etc.), software (such as is run on a general computer system or a dedicated machine), firmware or a combination. At module 215, CPM 210 launches an HPC workload selected from workloads store 205 to initiate the EE benchmarking technique. In one embodiment, a baseline measurement, which is further discussed below, is conducted on the HPC cluster by using module 215 to launch the selected workloads one by one (as shown in FIG. 5B) without a power constraint.

At modules 220 and 225, CPM 210 measures power and performance of the HPC cluster. In one embodiment, modules 220 and 225 determine the power and performance for each workload under no power constraint. According to one embodiment, the determined power and performance values are used to configure a baseline value (performance/watt) for performance (PB(i)) and power (WB(i)). In alternative embodiments, baseline values may be predefined as a parameter in the benchmark configuration.

As discussed above, multiple workloads are used to cover a variety of user applications. In one embodiment, the performance may be represented as FLOPs, megabytes, transactions, etc. Furthermore, even among various workloads that measure performance in FLOPs, the performance values that are measured, for example, can vary by large amounts by each workload. In one embodiment, in order to define energy efficiency scores that are comparable across workloads, a unit-less, normalized result is created for each workload by dividing the measured performance-per-watt (performance/watt) by the baseline values. In one embodiment, the baseline values remain constant across different SUTs and are collected on a baseline cluster while each workload is run without any external power constraint. In one embodiment, there is only one pair of baseline (performance/watt) values per workload and, as a result, the same baseline values are used to normalize the measured performance and power, $P[i,n]/W[i,n]$, at every power-level of the respective workload, as described in FIG. 4.

Figure 4:
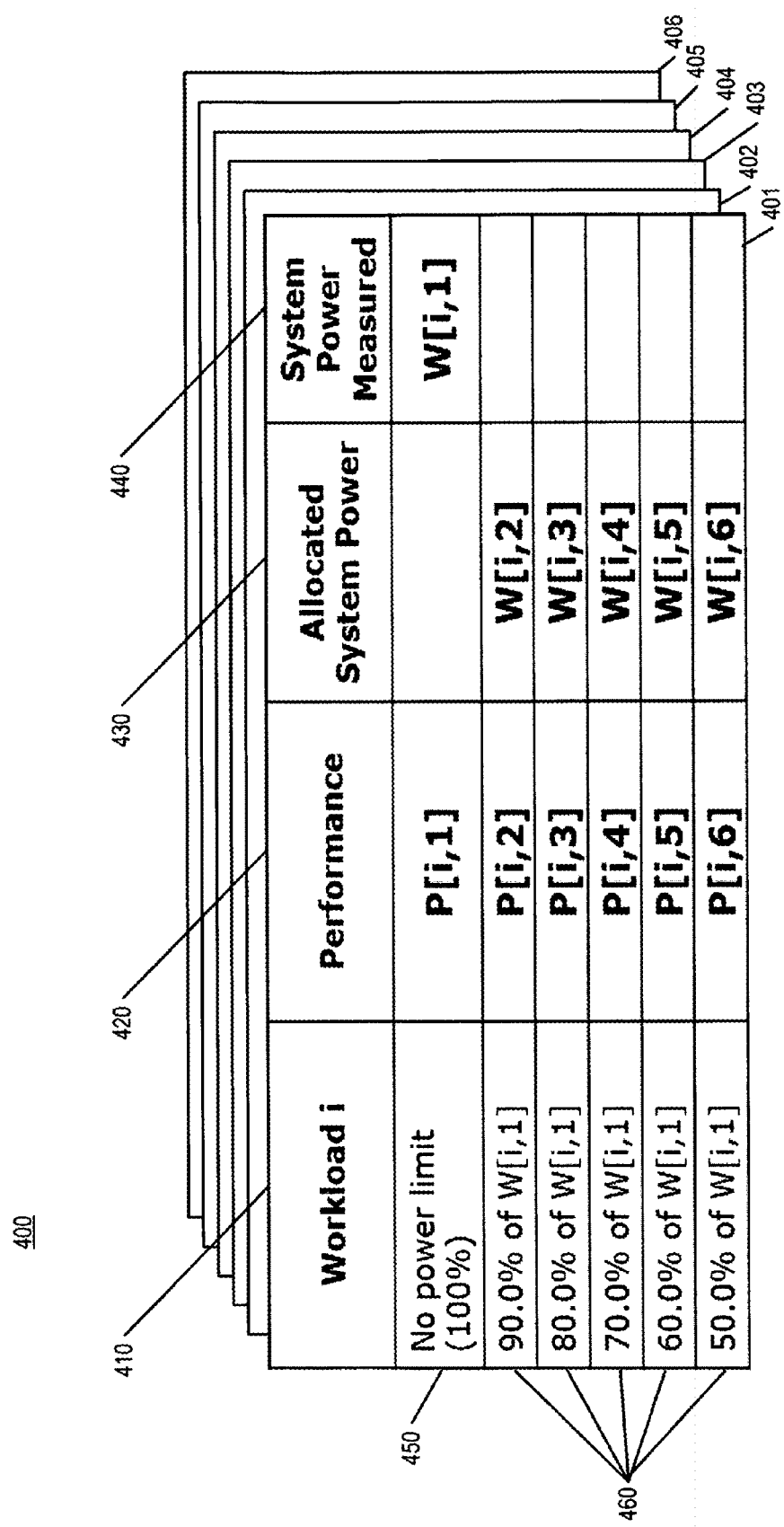
FIG. 4 is a table illustrating performance and power values obtained for different workloads operating under varying power constraints according to one embodiment.

At module 230, CPM 210 communicates the power limits to assess the energy efficiency of the HPC cluster under different power constraints. In one embodiment, the power limits are communicated to the SUT and EEC 250. In one embodiment, average power is determined by running a workload without any power constraint, which is considered full power or 100% power level (e.g., W[i,n] as shown in FIG. 4). In one embodiment, module 230 then obtains measurements when the power levels are limited, for example, between 50% and 90% of that full power value. In one embodiment, the SUT may not be able to meet the lower power limit constraints. For example, if the measured unlimited power for workload i is 4000 W, the benchmark control software (or power and performance management engine 265) directs the SUT to limit the system power to 2000 W in order to operate at 50% of full power. Continuing on with the above example, if the SUT is unable to limit power at such a low level, or if the SUT attempts to do so and actual average measured power for that run exceeds 2000 W, then the result is considered invalid.

Figure 6B:
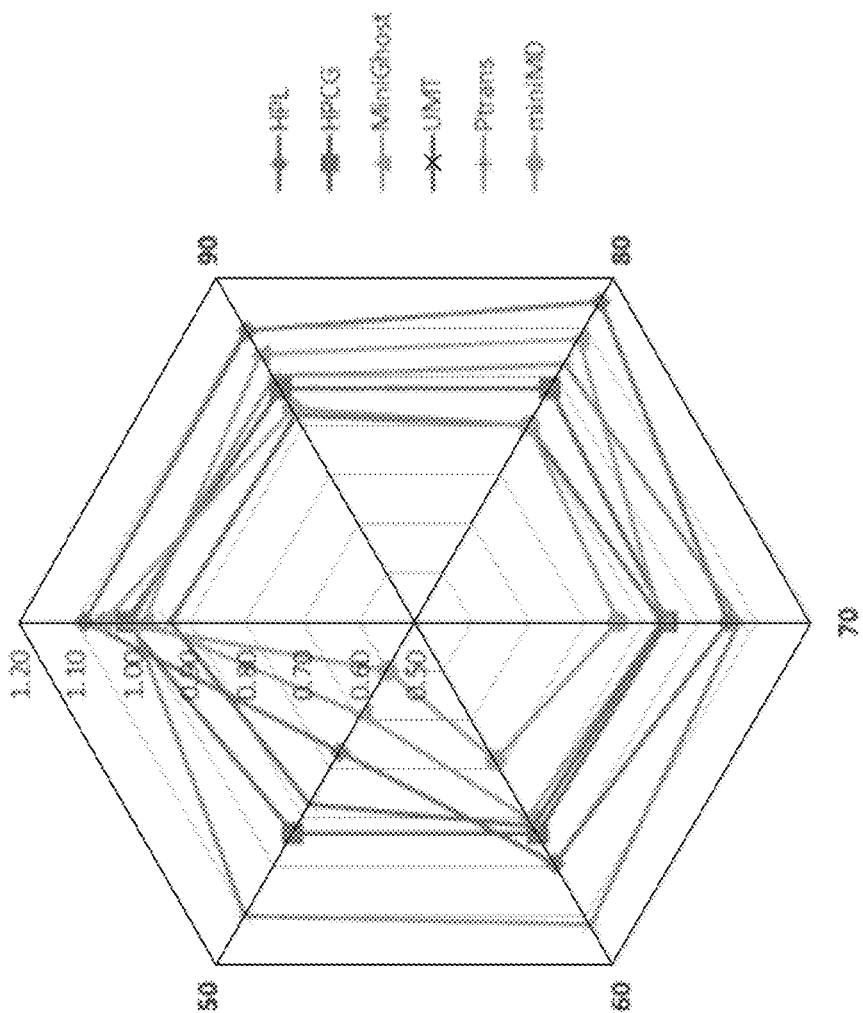
Figure 6B:
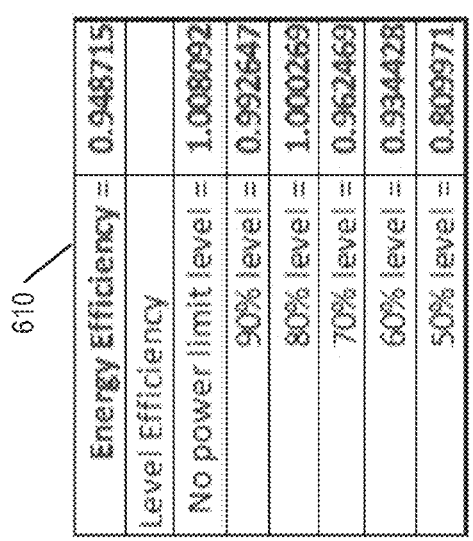

At module 233, CPM 210 relaunches the workloads under one or more power levels. At module 235, once all the selected workloads are run on all the selected power levels, CPM 210 calculates a power level efficiency and an energy efficiency (EE) benchmark metric for the HPC cluster. In one embodiment, after modules 215-230 are run on each of the SUTs to establish unconstrained power usage and measure con-strained power usage, an individual measurement (i.e., a normalized result) for each HPC workload under each power constraints is calculated as shown in FIG. 6A and charted in FIG. 6B. In one embodiment, the normalized results are calculated based on the baseline values, and then the geometric or arithmetic mean of the normalized results for workload (i) provide a workload energy efficiency score for that specific workload. In one embodiment, module 235 then calculates an overall EE benchmark metric based on, but not limited to, the geometric mean of all the workload energy efficiency scores, which is described in further detail below. Note that the overall EE benchmark metric may be calculated using one or more methods, as shown in FIG. 4.

At module 240, CPM 210 reports the power level efficiency and the energy efficiency (EE) metric of the HPC cluster to outputs 270. In one embodiment, after running each module to assess the HPC cluster, the resulting energy efficiency scores and the calculated EE metric are reported and forwarded to output 270. In one embodiment, the reported scores provide an assessment of the energy efficiency of the system at various operating conditions. The report may illustrated as one or more data tables (as shown in FIG. 6A) and/or one or more graphs/curves (as shown in FIG. 6B). As such, reporting the use of different workloads at various power levels will provide guidance for managing HPC clusters, and various types of jobs and workloads.

In one embodiment, outputs 270 receives the reported benchmark measurements and generates a user-friendly report from the benchmark measurements. In one embodiment, the user-friendly report may include a text file, an HTML table, a chart, and/or a combination of any of these. In one embodiment, outputs 270 enables a user to immediately identify energy efficiency and power budgeting scenarios. Accordingly, the user can identify whether the HPC cluster is operating without exceeding its allocated power budget. Through this identification, the user can determine optimal scenarios, such as opportunities to distribute the power budget to jobs running on the HPC cluster and maximize performance while operating jobs on one or more nodes under one or more power constraints. The configuration shown in FIG. 2 shall be referenced throughout the description.

Figure 3:
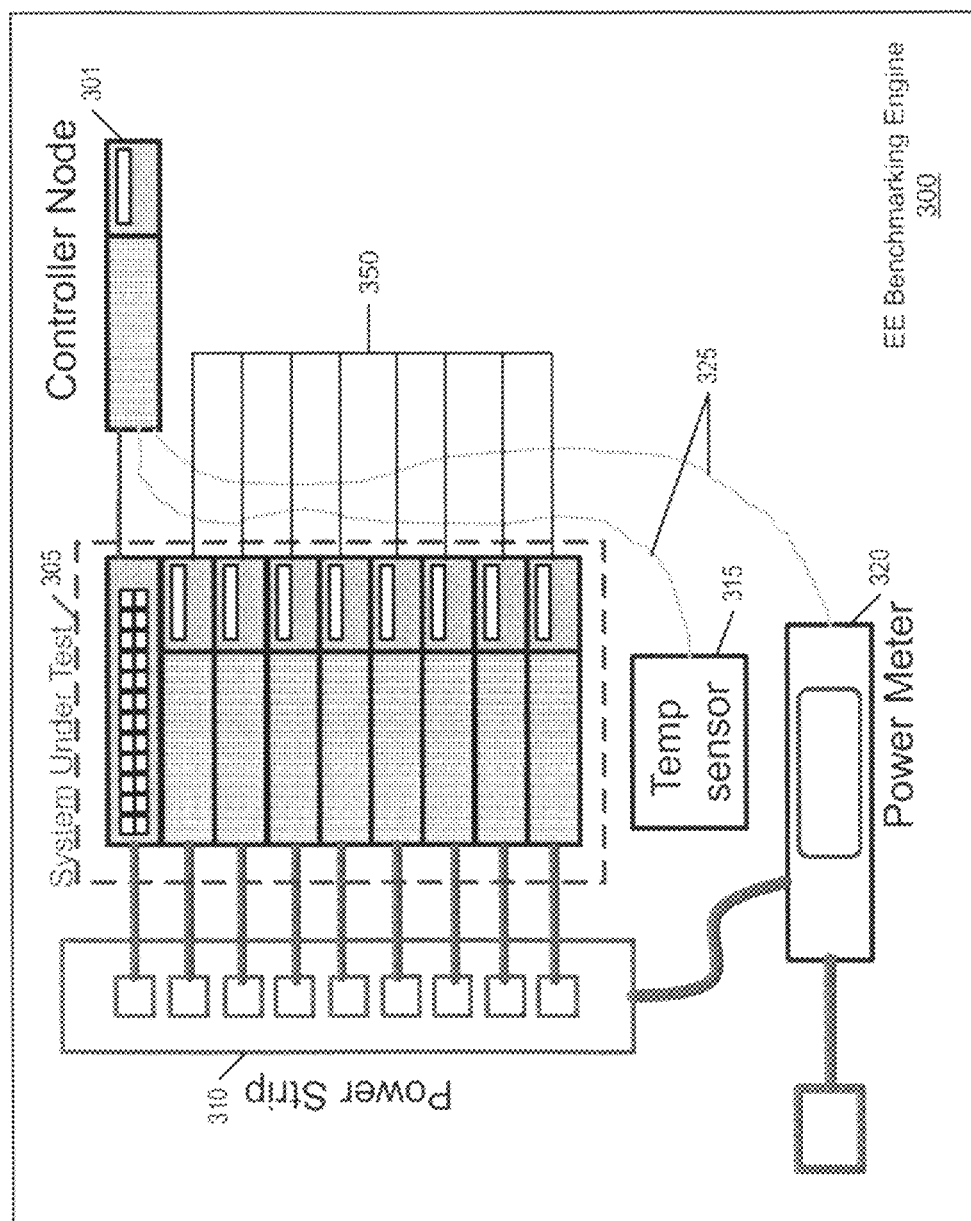
FIG. 3 is a block diagram illustrating an energy efficiency benchmarking engine according to one embodiment.

FIG. 3 is a block diagram illustrating an energy efficiency benchmarking engine according to one embodiment. FIG. 3 illustrates an example of interactions between different components of EE benchmarking engine 300. It is pointed out that the components of FIG. 3 that have the same reference numbers (or names) as components of any other figure can operate or function in any manner similar to that described herein, but are not limited to such. Further, the lines connecting the components represent communication between different components of EE benchmarking engine 300.

Referring now to FIG. 3, EE benchmarking engine 300 includes, but is not limited to, controller node 301, SUT 305, power strip 310, temp sensor 315, power meter 320, high-speed fabric 325, and HPC nodes 350. In addition, EE benchmarking engine 330 also includes a network switch and a storage system (e.g., local per node or shared nodes). In one embodiment, EE benchmarking engine 300 is designed to be operable on a cluster of HPC nodes, and includes everything needed to operate the cluster in a user environment, such as communication fabric, storage system, manageability solution, power, and cooling infrastructure.

In one embodiment, controller node 301 is a special node that is part of the cluster, but is not part of SUT 305. Controller node 301 runs an orchestration software application (e.g., the benchmark controller software) that is developed to run the EE benchmarking technique for measuring energy efficiency. For example, control node 301 is configured to launch jobs, communicate power levels and workloads, collect power data from power meter 320, and sync data collection received from SUT 305, temp sensor 315, and power meter 320. Controller node 301 communicates with SUT 305, power meter 320, temp sensor 315, and nodes 350 in order to profile the energy, power, and performance of the HPC cluster. Furthermore, controller node 301 launches the selected workloads from workload store 205 on nodes 350 within SUT 305.

According to one embodiment, SUT 305 may include one or more nodes 350. Similarly, SUT 305 receives a selected workload from controller node 301 and communicates with power strip 310 to assess the power and performance of each node 350. In one embodiment, nodes 350 may include one or more CPU cores, an accelerator, a memory, and a fabric connection.

Power strip 310 provides a power supply to each node 350 and is communicatively coupled to power meter 320. In one embodiment, power meter 320 is configured to determine the power and performance of each node 350, and report the power and performance measurement values to controller node 301 via high-speed fabric 325. Furthermore, temp sensor 315 is configured to monitor and control the temperature of SUT 305, and report the temperature measurements to controller node via high-speed fabric 325. For example, each node 350 may be connected with a baseboard management controller (BMC) that communicates with controller node via high-speed fabric 325. Furthermore, according to one example, the BMC monitors performance, power levels under various power constraints, and the front-panel temperature of each node 350. Continuing on with the above example, each BMC can report the power and thermal values for each node 350 when the appropriate IPMI command is issued.

In one embodiment, high-speed fabric 325 may include a wired communication, such an Ethernet cable or a general purpose interface bus (GPIB) cable, a wireless communication, such as a wireless local area network (LAN), a wireless personal area network (PNA), Bluetooth, Zigbee, IrDa or any other suitable protocol, or a combination of wired and wireless communication paths.

FIG. 4 illustrates one or more tables 401-406 that show exemplary performance and power values obtained from different workloads operating under varying power constraints according to one embodiment. Generally, each table (e.g., tables 401-406) illustrates a workload (i.e., workload i 410) and its corresponding measured performance and power values. For example, as shown in FIG. 6A, workload i=1 may correspond to one workload (e.g., HPL), while workload i=6 corresponds to another workload (e.g., miniMD).

Referring now to FIG. 4, system 400 includes tables 401-406 that correspond, for example, to six different workloads, but is not limited to any specific number of workloads. Table 401 illustrates workload i 410, performance 420, allocated system power 430, and system power measured 440. In one embodiment, performance and power of each of these components is measured separately, and the performance and power monitoring for each of these components is performed using a power meter (e.g., power meter 320) on the SUT.

In one embodiment, each workload i 410 is initially run under no power limit (100%), as shown in row 450, to determine baseline values for each workload. The baseline values are calculated for each workload as a baseline performance (i) and a baseline power WB(i), which are used to normalize the measured P[i,n]/W[i,n] values at every power level 460. In one embodiment, an energy efficiency calculation for each workload depends upon the condition in which the workload is run. For example, when a workload runs without a power limit as shown in row 450, the energy efficiency calculation is based on measured power (performance-per-watt shown as P[i,1] and W[i,1]), where power is based upon the measured energy that is consumed while running the workload, as shown in system power measured 440. However, when calculating performance-per-watt when a workload runs under a power limit as shown in rows 460, the energy efficiency calculation is based on allocated power as shown in allocated system power 430. For example, W[i,1] is measured power and W[i,2-6] is allocated power. Note that if the system power is over 2% (a threshold) of the allocated power, the run is invalid and not used for the energy efficiency calculation. In one embodiment, if $M(i,j) \leq W(i,j)+threshold$, where $M(i,j)$ is the calculated average cluster power, the run is invalid and also not used for the energy efficiency calculation. Also note that 2% is a selected threshold, but the benchmark configuration is not limited to a particular threshold value (e.g., 2%, 5%, etc.).

According to one embodiment, after running workload i under the six power limits, table 401 provides six pairs of inputs (P[i,1], W[i,1]; P[i,2], W[i,2]; P[i,3], W[i,3]; etc.) for workload i that are used for the energy efficiency calculations. Furthermore, the energy efficiency at each power level j (also referred to as step number) is calculated as P[i,j]/W[i,j]. Then, the score of workload (i) is calculated by dividing each one of those six resulting performance-per-watt ratios by the baseline performance-per-watt values for i in order to obtain six normalized energy efficiency scores, which is represented as S(i,j).

In one embodiment, the EE benchmarking technique provides various types of energy efficiencies, which include, but are not limited to, a normalized energy efficiency score at each power level (S(i,j)), a workload energy efficiency (E(i)), a power level energy efficiency (L(j)), and an overall EE benchmark metric (EE), which is calculated based on all of the power levels and workloads that were tested. The normalized energy efficiency score at each power level (S(i,j)) can be written as $$S(i, j) = \frac{P(i, j)/W(i, j)}{PB(i)/WB(i)}$$

where (i) is the workload number and (j) the step number, and PB(i) and WB(i) are baseline performance and power values—which results in a unit less, normalized score for workload (i).

The workload energy efficiency (E(i)) provides an energy efficiency measurement for workload (i) and is calculated based on the geometric or arithmetic mean of S(i,j) for workload (i). The workload energy efficiency (E(i)) can be written as $$E(i)=(\Pi_{j=1}^{6}S(i,j))^{1/6}$$

where, according to this embodiment, the geometric mean is used to calculate the workload efficiency. Furthermore, the power level energy efficiency (L(j)) provides an energy efficiency measurement that takes into consideration that some HPC clusters may not be able to limit workload power to certain desired power levels, which may result in invalid results at certain power levels. Accordingly, to understand energy efficiency at a desired power level/limit, the power level energy efficiency can be calculated at a specific power level (j) and written as $$L(j)=(\Pi_{i=1}^{6}S(i,j))^{1/6}$$

In one embodiment, the overall EE benchmark metric (EE) is calculated as the geometric mean of all the tested workloads and power levels and can be written as $$EE=(\Pi_{i=1}^{6}E(i))^{1/6}$$

Note that the various types of energy efficiency measurements described above are calculated based on the geometric mean $(\Pi_{i=1}^{j})$ where j is the total number of steps that are tested, but a user may select calculations based on the arithmetic mean. Furthermore, for example, the measurement values for each workload (i=1-6) at each power level (j=1-6) are shown in FIGS. 6A-B, and are used to calculate the overall EE benchmark metric as shown and charted in FIG. 6B.

FIGS. 5A-B illustrate an example of measuring energy efficiency of an HPC system with one or more workloads according to one embodiment. In one embodiment, system 500 includes a graph 501 and a sequence of workloads 502. Graph 501 shows a workload running on a SUT, and a measurement run to determine the power and performance when the workload is performed. Similarly, the sequence of workloads 502 includes a list of selected workloads (e.g., workloads 1-6) and illustrates, for example, the sequence that the workloads are performed, which start at the initialization step and end at the reporter step.

In one embodiment, graph 501 illustrates a power and performance measurement run that is calculated based on time and operations per second. For example, a workload measurement run may include the following stages: starting a power measurement, initiating a workload, allowing a warm-up phase until the operations per second of the workload have stabilized, measuring a phase of interest (also referred to as a measurement interval and/or a critical/calculation phase) of the workload to determine a power and performance measurement from start to end, allowing a wrap-up phase (also referred to as a post-measurement) after the end of the measurement interval, ending the workload, and ending the power measurement to have a delay between load levels. Furthermore, according to one embodiment, the power and performance measurement run of graph 501 is repeated for each following workload, and then each workload is performed again for each following power level. Note that the time between stages (as shown in graph 501) can be configured by a user and/or predefined by the benchmark control software configuration.

Continuing on with the above example, when a workload completes, the benchmark control software determines its performance, usually by reading it from a text file output by the workload itself. Furthermore, the benchmark control software also calculates the energy used by the entire SUT over the phase of interest of the workload and calculates the average power. According to one embodiment, there are two options, but are not limited, to get the system power consumption: one is through external power meter (e.g., 320), and the other one is through an IPMI command. For example, the benchmark control software gets energy consumed by the SUT approximately once-per-second, and it calculates power by dividing the energy consumed during the interval by the time duration. For example, after a specific workload finishes its run, the benchmark control software may use time stamps to correlate the appropriate data and calculate the average power.

Note that the power is measured when a workload is within its phase of interest, which generally corresponds to the time interval over which the computation performed by the workload is reported as its performance. Also note that the energy consumed to deliver that measure of performance is accounted as shown in graph 501.

FIGS. 6A-B illustrates tables 600 that show one or more measured workloads and various energy efficiency benchmark measurements according to one embodiment. FIG. 6A illustrates an example for calculating an overall EE benchmark metric. For this example, six workloads under six power constraints are run on a SUT. Each table includes a cluster power value, a performance value, a performance/watt value, a normalized performance/watt value, and a workload efficiency value that are measured for each workload. Furthermore, note that for each individual data point according to alternate embodiment, each selected workload may be run multiple times and calculated by using either the average or median performance-per-watt, which can be configured by the benchmark configuration (e.g., benchmark configuration engine 206).

Furthermore, according to one embodiment, an optimal operating point is selected for each workload. The optimal operating point is where each workload is running at its highest energy efficiency based on the measured performance per power values (Perf/Watt) and the one or more executed power levels (e.g., as shown in FIG. 6A, the optimal operating point for the HPL workload is at 80% (j=3) under these power levels). In one embodiment, a power limit is selected for each workload and generated based on the one or more executed power levels. The power limit is the minimum power level limit/point that the workload can efficiently run, where any power constraint below the power limit results in an invalid run.

Referring now to FIG. 6B. The normalized scores (i.e., 6 scores for 6 workloads for a total of 36 scores) of tables 600 is charted in FIG. 6B, including the normalized score for each workload at each power level. Table 610 shows the overall EE benchmark metric for the HPC cluster, and the calculated power level efficiency at each power level. Note that each data point is provided as an example for assessing energy efficiency of a HPC cluster operated under various power levels, but each HPC cluster and SUT provides different data points for different workloads at different power levels.

FIG. 7 is an exemplary block diagram illustrating a benchmark-workload application programming system 700 according to one embodiment. System 700 includes, but is not limited to, controller program manager 210, benchmark-workload application programming interface (API) 720, and workload 730. In one embodiment, system 700 may be implemented on EEBC 110 when a user requires a specific workload, which is not available in workloads store 205. For example, if the user requires that an additional new workload be used for calculations in light of the predominant workloads, benchmark-workload API 720 translates the commands from controller program manager 210 in order to command and launch the customized workload 730. Benchmark-workload API 720 also translates an output report from 730 into a report that can be assessed/processed by controller program manager 210.

Controller program manager 210 launches a workload 715 and forwards the workload to benchmark-workload API 720. In one embodiment, benchmark-workload API 720 receives the workload, configures the parameters (e.g., baseline values, number of runs, idle time, etc.) for the benchmark configuration engine based on the workload, and determines a "run" command that is applicable to the workload. At step 725, benchmark-workload API 720 launches/runs a customized workload 730 on the SUT. Accordingly, after the customized workload 730 is completed, benchmark-workload API 720 receives a set of results 730 from the customized workload 730. Benchmark-workload APIT 720 then forwards the set of results 745 to controller program manager 210 in order to calculate an EE benchmark metric based on the customized workload 730. Note that the benchmark-workload API may be included in EEBC 110 or provided by the user.

Figure 8:
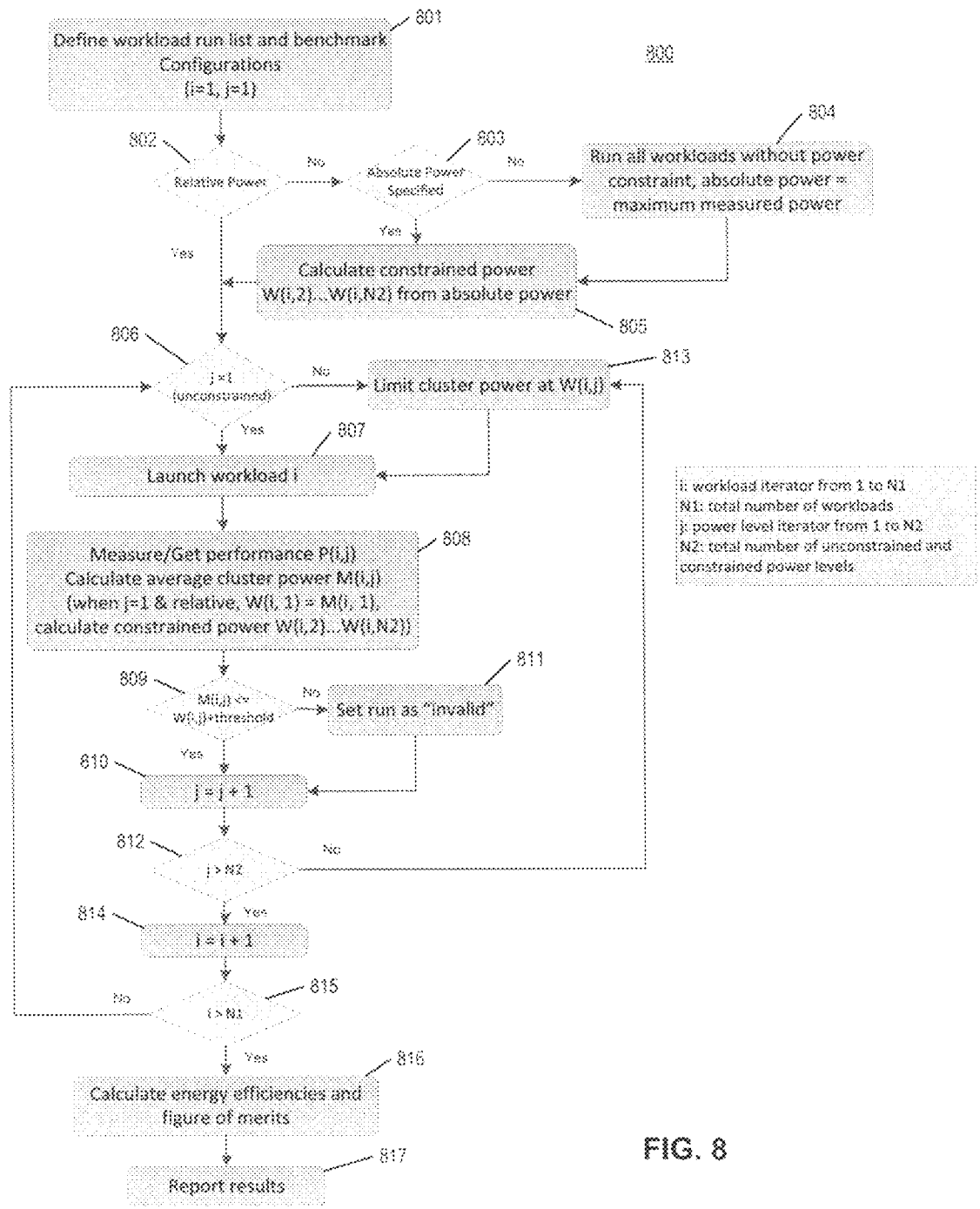
FIG. 8 is a flow diagram illustrating a method to assess energy efficiency of an HPC system with and without power constraints according to one embodiment.

FIG. 8 is a flowchart of a method 800 to assess energy efficiency of an HPC system with and without power constraints according to one embodiment. Method 800 can be performed by processing logic that may be implemented in software, firmware, hardware, or any combination thereof. In one embodiment, method 800 is performed by an EEBC (e.g., EEBC 110). In one embodiment, method 800 is implemented on an EE benchmarking engine (e.g., EE benchmarking engine 300). Method 800 is configured to perform one or more workloads (i is a workload iterator from 1 to N1, where N1 is the total number of workloads) at one or more power levels (j is a power level iterator from 1 to N2, where N2 is the total number of unconstrained and constrained power levels).

At block 801, a workload run list and one or more benchmark configurations are defined. At block 802, determine whether the benchmark configuration is calculating a relative power. In one embodiment, the relative power is configured to use 100% power of the same workload. If the relative power is calculated, the method proceeds to determine whether the power level is unconstrained (j=1) at block 806. If the relative power is not calculated, the method proceeds to determine whether an absolute power is specified at block 803. In one embodiment, the absolute power is configured to use a maximum measured power that is derived from using 100% of power for each workload. If the absolute power is specified, constrained power (W(i,2)–W(i,N2)) is calculated using the specified absolute power at block 805. If the absolute power is not specified, the workload run list (i.e., each selected workload) is run without power constraint at block 804, which provides that the absolute power is equal to the maximum measured power.

At block 805, the constrained power (W(i,2)–W(i,N2)) is calculated using either the specified absolute power from block 803 or the measured absolute power from block 804. At block 806, determine whether the power level is unconstrained (j=1). If the power level is not unconstrained (j≠1), cluster power at W(i,j) is limited to a desired power level (e.g., 90%, 80, 70% of W(i,1)) at block 813, and then proceeds to block 807. If the power level is unconstrained, workload i is launched at block 807.

At block 808, a performance (P(i,j)) is measured, an average cluster power (M(i,j)) is calculated, and a constrained power (W(i,2)–W(i,N2)) is calculated when j≠1. Furthermore, when j=1 and relative power is calculated, the cluster power W(i,1) equals the calculated average cluster power M(i,1).

At block 809, determine whether the calculated average cluster power is less than, or equal to, the addition of the cluster power at W(i,j) and a threshold. In one embodiment, the threshold is calculated as 2%. If M(i,j) is not less than, or equal to, the addition of the cluster power at W(i,j) and the threshold, the run is set as "invalid" at block 811. In one embodiment, the run is set as "invalid" if the system power is over 2% of the allocated power. If M(i,j) is less than, or equal to, the addition of the cluster power at W(i,j) and the threshold, the power level iterator (j) adds a value of one (j=j+1) at block 810.

At block 812, determine whether the power level iterator is greater than the total number of power levels (j>N2). If the power level iterator is not greater than the total number of power levels, the method returns to block 813 to calculate performance and power at the following power level (e.g., W(i,2)). If the power level iterator is greater than the total number of power levels, the workload iterator (i) adds a value of one (i=i+1) at block 814. At block 815, determine whether the workload iterator (i) is greater than the total number of workloads. If the workload iterator (i) is not greater than the total number of workloads, the method returns to block 806 to launch the following workload (e.g., i=2). If the workload iterator (i) is greater than the total number of workloads, a figure of merits and one or more energy efficiencies are calculated at block 816.

In one embodiment, the figure of merits (as described in FIGS. 4 and 6A-B) includes one ore more EE benchmark metrics, which may be calculated based on simple addition, and/or the arithmetic or geometric mean of all the calculated efficiencies. At block 817, the results are reported. In one embodiment, the results are reported (e.g., outputs 270) to a user, and may enable the user to immediately identify energy efficiency and power budgeting scenarios. Accordingly, the user can identify whether the HPC cluster is operating without exceeding its allocated power budget. Through this identification, the user can determine optimal scenarios, such as opportunities to distribute the power budget to jobs running on the HPC cluster and maximize performance while operating jobs on one or more nodes under one or more power constraints.

Figure 9:
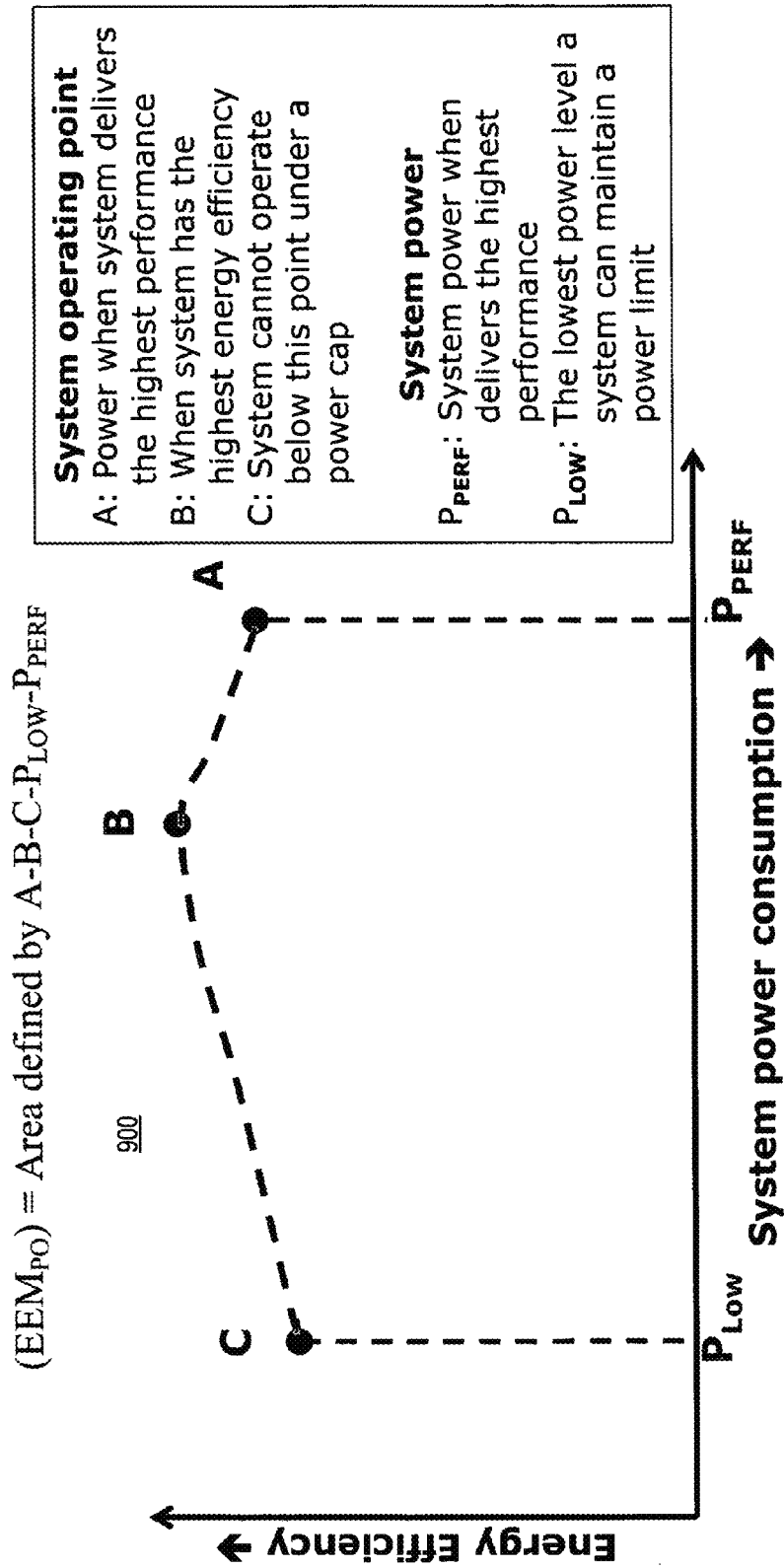
FIG. 9 illustrates an example of measuring an energy efficiency metric of a workload over a range of power operations according to one embodiment.

FIG. 9 illustrates an example of measuring an energy efficiency metric of a workload over a range of power operations according to one embodiment. In one embodiment, graph 900 illustrates an EE metric ($EEM_{PO}$) (also referred to as an area under a power curve) from the one or more figure of merits that represents the energy efficiency of a workload over a range of power operations. Graph 900 shows one or more system operating points (e.g., A, B, C) and the system's power consumption, which provides the system's highest performance (e.g., $P_{PERF}$) and lowest power level performance (e.g., $P_{LOW}$).

In one embodiment, the system operating points include: "A"=Power when system delivers the highest performance, "B"=Power when system has the highest energy efficiency, and "C"=System cannot operate below this point under a power cap. In one embodiment, the system power consumptions include: "$P_{PERF}$"=System power that delivers the highest performance, and "$P_{LOW}$"=Lowest power level a system can maintain a power limit. Accordingly, these measurements (A-B-C-$P_{LOW}$-$P_{PERF}$) define the measured area that is used to calculate the energy efficiency of the workload over the range of measure power operations (i.e., $EEM_{PO}$).

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

The following examples pertain to further embodiments:

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint, wherein the baseline configuration includes identifying a baseline performance and a baseline power for each selected HPC workload, and wherein assessing energy efficiency is based on at least one of a performance per allocated power unit and a performance per measured power unit.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, generating a benchmark metric for the SUT based on a baseline configuration for each selected HPC workload and a plurality of measured performance per power values for each executed workload at each selected power constraint, wherein the baseline configuration includes identifying a baseline performance and a baseline power for each selected HPC workload, and calculating a baseline performance per power unit for each selected HPC workload based on the baseline performance and the baseline power for the respective HPC workload, wherein assessing energy efficiency is based on at least one of a performance per allocated power unit and a performance per measured power unit.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, normalizing one or more energy efficiency scores for each selected HPC workload by dividing the measured performance per power values for each of the one or more selected power constraints by the calculated baseline performance per power value for the respective HPC workload, generating a benchmark metric for the SUT based on a baseline configuration for each selected HPC workload and a plurality of measured performance per power values for each executed workload at each selected power constraint, selecting an optimal operating point for each selected workload, wherein the operating point is determined based on the measured performance per power values and the one or more power constraints, generating a power limit for each selected workload based on the one or more executed power constraints, and calculating a workload efficiency for the SUT for each selected HPC workload based on the one or more normalized energy efficiency scores.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, normalizing one or more energy efficiency scores for each selected HPC workload by dividing the measured performance per power values for each of the one or more selected power constraints by the calculated baseline performance per power value for the respective HPC workload, generating a benchmark metric for the SUT based on a baseline configuration for each selected HPC workload and a plurality of measured performance per power values for each executed workload at each selected power constraint, selecting an optimal operating point for each selected workload, wherein the operating point is determined based on the measured performance per power values and the one or more power constraints, generating a power limit for each selected workload based on the one or more executed power constraints, calculating a workload efficiency for the SUT for each selected HPC workload based on the one or more normalized energy efficiency scores, and determining a power level efficiency for the SUT for each selected HPC workload at a defined power level.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint, wherein generating the benchmark metric further includes at least the workload efficiency of each selected HPC workload.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint, wherein generating the baseline configuration includes defining a relative power of the HPC system or an absolute power of the HPC system.

A method of assessing energy efficiency of a High-performance computing (HPC) system, comprising, selecting a plurality of HPC workloads to run on a system under test (SUT) with one or more power constraints, wherein the SUT includes a plurality of HPC nodes in the HPC system, executing the plurality of HPC workloads on the SUT, generating a benchmark metric for the SUT based on a baseline configuration for each selected HPC workload and a plurality of measured performance per power values for each executed workload at each selected power constraint, and defining a threshold value for the plurality of measured performance per power values.

A method of assessing energy efficiency of a High-performance computing (HPC) system, comprising, selecting a plurality of HPC workloads to run on a system under test (SUT) with one or more power constraints, wherein selecting one or more power constraints includes an unconstrained power level and one or more constrained power levels, and wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint, wherein the baseline configuration includes identifying a baseline performance and a baseline power for each selected HPC workload, and wherein assessing energy efficiency is based on at least one of a performance per allocated power unit and a performance per measured power unit.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, generating a benchmark metric for the SUT based on a baseline configuration for each selected HPC workload and a plurality of measured performance per power values for each executed workload at each selected power constraint, wherein the baseline configuration includes identifying a baseline performance and a baseline power for each selected HPC workload, and calculating a baseline performance per power unit for each selected HPC workload based on the baseline performance and the baseline power for the respective HPC workload, wherein assessing energy efficiency is based on at least one of a performance per allocated power unit and a performance per measured power unit.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, normalizing one or more energy efficiency scores for each selected HPC workload by dividing the measured performance per power values for each of the one or more selected power constraints by the calculated baseline performance per power value for the respective HPC workload, generating a benchmark metric for the SUT based on a baseline configuration for each selected HPC workload and a plurality of measured performance per power values for each executed workload at each selected power constraint, selecting an optimal operating point for each selected workload, wherein the operating point is determined based on the measured performance per power values and the one or more power constraints, generating a power limit for each selected workload based on the one or more executed power constraints, and calculating a workload efficiency for the SUT for each selected HPC workload based on the one or more normalized energy efficiency scores.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, normalizing one or more energy efficiency scores for each selected HPC workload by dividing the measured performance per power values for each of the one or more selected power constraints by the calculated baseline performance per power value for the respective HPC workload, generating a benchmark metric for the SUT based on a baseline configuration for each selected HPC workload and a plurality of measured performance per power values for each executed workload at each selected power constraint, selecting an optimal operating point for each selected workload, wherein the operating point is determined based on the measured performance per power values and the one or more power constraints, generating a power limit for each selected workload based on the one or more executed power constraints, calculating a workload efficiency for the SUT for each selected HPC workload based on the one or more normalized energy efficiency scores, and determining a power level efficiency for the SUT for each selected HPC workload at a defined power level.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint, wherein generating the benchmark metric further includes at least the workload efficiency of each selected HPC workload.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint, wherein generating the baseline configuration includes defining a relative power of the HPC system or an absolute power of the HPC system.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein the SUT includes a plurality of HPC nodes in the HPC system, executing the plurality of HPC workloads on the SUT, generating a benchmark metric for the SUT based on a baseline configuration for each selected HPC workload and a plurality of measured performance per power values for each executed workload at each selected power constraint, and defining a threshold value for the plurality of measured performance per power values.

A computer readable medium having stored thereon sequences of instruction which are executable by a system, and which, when executed by the system, cause the system to perform a method, comprising, selecting a plurality of HPC workloads to run on a system under test (SUT) with one or more power constraints, wherein selecting one or more power constraints includes an unconstrained power level and one or more constrained power levels, and wherein the SUT includes a plurality of HPC nodes in the HPC system, executing the plurality of HPC workloads on the SUT, and generating a benchmark metric for the SUT based on a baseline configuration for each selected HPC workload and a plurality of measured performance per power values for each executed workload at each selected power constraint.

A system for assessing energy efficiency of a High-performance computing (HPC) system, comprising, a HPC energy efficiency benchmark controller to select a plurality of HPC workloads to run on a system under test (SUT) with one or more power constraints, wherein the SUT includes a plurality of HPC nodes in the HPC system, a controller node to execute the plurality of HPC workloads on the SUT, and the HPC energy efficiency benchmark controller to generate a benchmark metric for the SUT based on a baseline configuration for each selected HPC workload and a plurality of measured performance per power values for each executed workload at each selected power constraint.

A system for assessing energy efficiency of a High-performance computing (HPC) system, comprising, a HPC energy efficiency benchmark controller to select a plurality of HPC workloads to run on a system under test (SUT) with one or more power constraints, wherein the SUT includes a plurality of HPC nodes in the HPC system, and wherein the HPC energy efficiency benchmark controller identifies a baseline performance and a baseline power for each selected HPC workload, and selects the one or more power constraints from an unconstrained power level and one or more constrained power levels, a controller node to execute the plurality of HPC workloads on the SUT, the HPC energy efficiency benchmark controller to generate a benchmark metric for the SUT based on a baseline configuration for each selected HPC workload and a plurality of measured performance per power values for each executed workload at each selected power constraint, and wherein assessing energy efficiency is based on at least one of a performance per allocated power unit and a performance per measured power unit.

A system for assessing energy efficiency of a High-performance computing (HPC) system, comprising, a HPC energy efficiency benchmark controller to select a plurality of HPC workloads to run on a system under test (SUT) with one or more power constraints, wherein the SUT includes a plurality of HPC nodes in the HPC system, and wherein the HPC energy efficiency benchmark controller identifies a baseline performance and a baseline power for each selected HPC workload, selects the one or more power constraints from an unconstrained power level and one or more constrained power levels, and calculates a baseline performance per power unit for each selected HPC workload based on the baseline performance and the baseline power for the respective HPC workload, a controller node to execute the plurality of HPC workloads on the SUT, the HPC energy efficiency benchmark controller to generate a benchmark metric for the SUT based on a baseline configuration for each selected HPC workload and a plurality of measured performance per power values for each executed workload at each selected power constraint, and wherein assessing energy efficiency is based on at least one of a performance per allocated power unit and a performance per measured power unit.

A system for assessing energy efficiency of a High-performance computing (HPC) system, comprising, a HPC energy efficiency benchmark controller to select a plurality of HPC workloads to run on a system under test (SUT) with one or more power constraints, wherein the SUT includes a plurality of HPC nodes in the HPC system, a controller node to execute the plurality of HPC workloads on the SUT, the HPC energy efficiency benchmark controller normalizes one or more energy efficiency scores for each selected HPC workload by dividing the measured performance per power values for each of the one or more selected power constraints by the calculated baseline performance per power value for the respective HPC workload, and the HPC energy efficiency benchmark controller to generate a benchmark metric for the SUT based on a baseline configuration for each selected HPC workload and a plurality of measured performance per power values for each executed workload at each selected power constraint, wherein the HPC energy efficiency benchmark controller further selects an optimal operating point for each selected workload, wherein the operating point is determined based on the measured performance per power values and the one or more power constraints, generates a power limit for each selected workload based on the one or more executed power constraints, calculates a workload efficiency for the SUT for each selected HPC workload based on the one or more normalized energy efficiency scores, and determines a power level efficiency for the SUT for each selected HPC workload at a defined power level.

A system for assessing energy efficiency of a High-performance computing (HPC) system, comprising, a HPC energy efficiency benchmark controller to select a plurality of HPC workloads to run on a system under test (SUT) with one or more power constraints, wherein the SUT includes a plurality of HPC nodes in the HPC system, a controller node to execute the plurality of HPC workloads on the SUT, and the HPC energy efficiency benchmark controller to generate a benchmark metric for the SUT based on a baseline configuration for each selected HPC workload and a plurality of measured performance per power values for each executed workload at each selected power constraint, wherein the benchmark metric is based on at least one of the measured performance per power values and a normalized performance per power values, and includes using at least one of a geometric mean, an arithmetic mean, and an area under a power curve.

A system for assessing energy efficiency of a High-performance computing (HPC) system, comprising, a HPC energy efficiency benchmark controller to select a plurality of HPC workloads to run on a system under test (SUT) with one or more power constraints, wherein the HPC energy efficiency benchmark controller defines a relative power of the HPC system or an absolute power of the HPC system, and wherein the SUT includes a plurality of HPC nodes in the HPC system, a controller node to execute the plurality of HPC workloads on the SUT, and the HPC energy efficiency benchmark controller to generate a benchmark metric for the SUT based on a baseline configuration for each selected HPC workload and a plurality of measured performance per power values for each executed workload at each selected power constraint.

A system for assessing energy efficiency of a High-performance computing (HPC) system, comprising, a HPC energy efficiency benchmark controller to select a plurality of HPC workloads to run on a system under test (SUT) with one or more power constraints, wherein the SUT includes a plurality of HPC nodes in the HPC system, and wherein the HPC energy efficiency benchmark controller defines a threshold value for the plurality of measured performance per power values, a controller node to execute the plurality of HPC workloads on the SUT, and the HPC energy efficiency benchmark controller to generate a benchmark metric for the SUT based on a baseline configuration for each selected HPC workload and a plurality of measured performance per power values for each executed workload at each selected power constraint.

In the foregoing specification, methods and apparatuses have been described with reference to specific exemplary embodiments thereof. It will be evident that various modifications may be made thereto without departing from the broader spirit and scope of embodiments as set forth in the following claims. The specification and drawings are, accordingly, to be regarded in an illustrative sense rather than a restrictive sense.

What is claimed is:

1. A method of assessing energy efficiency of a High-performance computing (HPC) system, comprising:
    selecting a plurality of HPC workloads to run on a system under test (SUT) with one or more power constraints, wherein the SUT includes a plurality of HPC nodes in the HPC system;
    executing the plurality of HPC workloads on the SUT;
    generating a benchmark metric for the SUT based on a baseline configuration for each selected HPC workload and a plurality of measured performance per power values for each executed workload at each selected power constraint;
    normalizing one or more energy efficiency scores for each selected HPC workload by dividing the measured performance per power values for each of the one or more selected power constraints by the calculated baseline performance per power value for the respective HPC workload;
    selecting an optimal operating point for each selected workload, wherein the operating point is determined based on the measured performance per power values and the one or more power constraints;
    generating a power limit for each selected workload based on the one or more executed power constraints; and
    calculating a workload efficiency for the SUT for each selected HPC workload based on the one or more normalized energy efficiency scores.

2. The method of claim 1, wherein the baseline configuration includes identifying a baseline performance and a baseline power for each selected HPC workload, and wherein assessing energy efficiency is based on at least one of a performance per allocated power unit and a performance per measured power unit.

3. The method of claim 2, further comprising calculating a baseline performance per power value for each selected HPC workload based on the baseline performance and the baseline power for the respective HPC workload.

4. The method of claim 1, further comprising determining a power level efficiency for the SUT for each selected HPC workload at a defined power level.

5. The method of claim 1, wherein generating the benchmark metric includes using at least one of a geometric mean, an arithmetic mean, and an area under a power curve, and is based on at least one of the measured performance per power values and a normalized performance per power values.

6. The method of claim 1, wherein determining the baseline configuration includes defining a relative power of the HPC system or an absolute power of the HPC system.

7. The method of claim 1, further comprising defining a threshold value for the plurality of measured performance per power values.

8. The method of claim 1, wherein selecting one or more power constraints includes an unconstrained power level and one or more constrained power levels.

9. A non-transitory computer readable medium having stored thereon sequences of instruction which are executable by a system, and which, when executed by the system, cause the system to perform a method, comprising:
selecting a plurality of HPC workloads to run on a system under test (SUT) with one or more power constraints, wherein the SUT includes a plurality of HPC nodes in the HPC system;
executing the plurality of HPC workloads on the SUT;
generating a benchmark metric for the SUT based on a baseline configuration for each selected HPC workload and a plurality of measured performance per power values for each executed workload at each selected power constraint;
normalizing one or more energy efficiency scores for each selected HPC workload by dividing the measured performance per power values for each of the one or more selected power constraints by the calculated baseline performance per power value for the respective HPC workload;
selecting an optimal operating point for each selected workload, wherein the operating point is determined based on the measured performance per power values and the one or more power constraints;
generating a power limit for each selected workload based on the one or more executed power constraints; and
calculating a workload efficiency for the SUT for each selected HPC workload based on the one or more normalized energy efficiency scores.

10. The non-transitory computer readable medium of claim 9, wherein the baseline configuration includes identifying a baseline performance and a baseline power for each selected HPC workload, and wherein assessing energy efficiency is based on at least one of a performance per allocated power unit and a performance per measured power unit.

11. The non-transitory computer readable medium of claim 10, further comprising calculating a baseline performance per power unit for each selected HPC workload based on the baseline performance and the baseline power for the respective HPC workload.

12. The non-transitory computer readable medium of claim 9, further comprising determining a power level efficiency for the SUT for each selected HPC workload at a defined power level.

13. The non-transitory computer readable medium of claim 9, wherein generating the benchmark metric includes using at least one of a geometric mean, an arithmetic mean, and an area under a power curve, and is based on at least one of the measured performance per power values and a normalized performance per power values.

14. The non-transitory computer readable medium of claim 9, wherein determining the baseline configuration includes defining a relative power of the HPC system or an absolute power of the HPC system.

15. The non-transitory computer readable medium of claim 9, further comprising defining a threshold value for the plurality of measured performance per power values.

16. The non-transitory computer readable medium of claim 9, wherein selecting one or more power constraints includes an unconstrained power level and one or more constrained power levels.

17. A system for assessing energy efficiency of a High-performance computing (HPC) system, comprising:
a HPC energy efficiency benchmark controller to select a plurality of HPC workloads to run on a system under test (SUT) with one or more power constraints, wherein the SUT includes a plurality of HPC nodes in the HPC system; and
a controller node to execute the plurality of HPC workloads on the SUT;
wherein the HPC energy efficiency benchmark controller generates a benchmark metric for the SUT based on a baseline configuration for each selected HPC workload and a plurality of measured performance per power values for each executed workload at each selected power constraint,
wherein the HPC energy efficiency benchmark controller normalizes one or more energy efficiency scores for each selected HPC workload by dividing the measured performance per power values for each of the one or more selected power constraints by the calculated baseline performance per power value for the respective HPC workload, selects an optimal operating point for each selected workload, wherein the operating point is determined based on the measured performance per power values and the one or more power constraints, generates a power limit for each selected workload based on the one or more executed power constraints, calculates a workload efficiency for the SUT for each selected HPC workload based on the one or more normalized energy efficiency scores, and determines a power level efficiency for the SUT for each selected HPC workload at a defined power level.

18. The system of claim 17, wherein the HPC energy efficiency benchmark controller identifies a baseline performance and a baseline power for each selected HPC workload, selects the one or more power constraints from an unconstrained power level and one or more constrained power levels, and wherein assessing energy efficiency is based on at least one of a performance per allocated power unit and a performance per measured power unit.

19. The system of claim 18, wherein the HPC energy efficiency benchmark controller calculates a baseline performance per power unit for each selected HPC workload based on the baseline performance and the baseline power for the respective HPC workload.

20. The system of claim 17, wherein the HPC energy efficiency benchmark controller generates the benchmark metric based on at least one of the measured performance per power values and a normalized performance per power values, and includes using at least one of a geometric mean, an arithmetic mean, and an area under a power curve.

21. The system of claim 17, wherein the HPC energy efficiency benchmark controller defines a relative power of the HPC system or an absolute power of the HPC system.

22. The system of claim 17, wherein the HPC energy efficiency benchmark controller defines a threshold value for the plurality of measured performance per power values.

* * * * *